Patented Jan. 1, 1935

1,986,702

UNITED STATES PATENT OFFICE 1,986,702

MANUFACTURE OF IRON ALLOYS

Virginio Angelini, Milan, Italy

No Drawing. Application May 25, 1932, Serial No. 613,566. In Belgium June 6, 1931

1 Claim. (Cl. 75—45)

For the production of metal known as unoxidable iron or steel, there is employed an alloy of chrome-iron or chrome-nickel-iron containing a proportion of carbon not exceeding 0.15%.

This alloy is relatively expensive and, therefore, affects the cost of unoxidable iron or steel which is being produced and owing to which fact its use is today limited.

Chrome-iron is obtained by reduction of the mineral known as chromite.

By effecting this reduction with a mixture consisting of silicon and aluminium as reducing agents in determinate proportions, it is possible to obtain through a simultaneous reaction of these two exothermic reducing agents, an alloy containing a small proportion of carbon.

As the simultaneous use of the reducing agents, silicon and aluminium, may produce a metal containing a variable percentage of silicon and aluminium, which is often considerable, the object of the present invention is a process which eliminates this objection.

The process for the manufacture of the chrome-iron and chrome-iron-nickel alloy, known as unoxidable iron or steel, according to the present invention involves the employment of a mixture of silicon and aluminium as reducing agents, one or more reducible oxides (for instance oxide of chromium, of nickel and the like) in the presence of an artificial slag composed partly of the selfsame metallic oxide and partly of lime, bauxite, fluor-spar, so that the reducible composite or composites (metallic oxides) are slightly in excess in relation to the reducing agents.

Unoxidable chrome-nickel-iron or steel can be produced directly by effecting the reduction of oxide composites of chrome and nickel such as chromites and oxides of nickel in a bath of molten iron or steel, containing the proportion of carbon desired in the final alloys.

The use of the reducing mixture consisting of silicon and aluminium in prearranged proportions, thoroughly mixed together, offers the advantage that during the reaction a siliceous aluminous slag of constant composition is formed, which, coming into contact with the above mentioned artificial slag, acts as a strainer for impurities and absorbs the eventual excess of the reducing agents preventing their introduction into the final alloy.

For the direct production of unoxidable iron or steel one proceeds in the following manner:

One first melts a charge composed of chromite, nickel-oxide, lime, bauxite, fluor-spar on a certain quantity of iron or steel, and when the whole is melted one adds the mixture of chromite, nickel-oxide, silicon and aluminium, thoroughly mixed. If desired, this mixture can be added in one or more charges.

In carrying the invention into effect, in order to obtain the refined alloy in one single operation, the mixtures used have definite quantity ratios and are added in a particular manner, i. e. as follows: To a bath of 500 kilograms of molten iron or steel with the desired carbon content there is introduced 300 kilograms of chromite (48% $Cr_2O_3$), 30 kilograms of nickel oxide, 150 kilograms of lime (CaO), 40 kilograms of fluor-spar ($CaFl_2$) and 30 kilograms of bauxite, and to this mass when the whole is melted to form an artificial slag, there is added a further quantity of the metal oxides and the reducing agents in the following amounts: 820 kilograms of chromite (48% $Cr_2O_3$) 110 kilograms of nickel oxide, 316 kilograms of aluminium and 82 kilograms of ferrosilicon (75% silicon).

It is sometimes desirable, before adding the reducing mixture, to add to the metallic bath small quantities of deoxidizing agents, such as manganese-iron, silicon-manganese, or silicon-manganese-aluminium.

The process may be preferably carried out in an electric furnace of the Heroult type or similar type providing it is suitable to maintain the final product in a fluid state.

If the chromium mineral contains, for instance, 48% of oxide of chromium, the desired alloy will have a proportion of 18% of chromium and 8% of nickel.

Having now described my invention what I claim as new and desire to secure by Letters Patent is:

A process of producing a chromium-nickel-iron or steel alloy known as rustless iron or steel, by the reduction of the metal oxides of chromium and nickel by means of non-carbonaceous reducing agents, characterized by the feature that, in order to obtain the desired alloy in one single operation, the mixtures used have definite quantity ratios and are added in a particular manner, i. e. as follows: to a bath of 500 kilograms of molten iron or steel with the desired carbon content there is introduced 300 kilograms of chromite 48% $Cr_2O_3$, 30 kilograms of nickel oxide, 150 kilograms of lime (CaO), 40 kilograms of fluor-spar ($CaFl_2$) and 30 kilograms of bauxite, and to this mass, when the whole is melted to form an artificial slag, there is added a further quantity of the metal oxides and the reducing agents in the following amounts: 820 kilograms of chromite 48% $Cr_2O_3$, 110 kilograms of nickel oxide, 316 kilograms of aluminium, and 82 kilograms of ferrosilicon, 75% silicon.

VIRGINIO ANGELINI.